United States Patent
Karmie et al.

(10) Patent No.: US 9,670,626 B2
(45) Date of Patent: Jun. 6, 2017

(54) IMPERMEABLE LINER, SUBSTRATE, AND ARTIFICIAL GRASS SURFACE FOR ANIMALS AND HUMAN BEINGS TO WALK THEREON WITH HIDDEN CLEANING STRUCTURE AND METHOD FOR USE THEREOF

(71) Applicants: Kenneth Alan Karmie, Uniontown, OH (US); Dale Edwin Karmie, Hartville, OH (US); Brian Andrew Karmie, Uniontown, OH (US)

(72) Inventors: Kenneth Alan Karmie, Uniontown, OH (US); Dale Edwin Karmie, Hartville, OH (US); Brian Andrew Karmie, Uniontown, OH (US)

(*) Notice: Subject to any disclaimer, the term of this patent is extended or adjusted under 35 U.S.C. 154(b) by 0 days.

(21) Appl. No.: 14/789,640

(22) Filed: Jul. 1, 2015

(65) Prior Publication Data
US 2015/0299964 A1    Oct. 22, 2015

Related U.S. Application Data

(63) Continuation of application No. 12/150,561, filed on Apr. 29, 2008, now abandoned.

(51) Int. Cl.
| | | |
|---|---|---|
| *E01C 13/02* | (2006.01) | |
| *E01C 13/08* | (2006.01) | |
| *B08B 3/04* | (2006.01) | |
| *A01K 1/015* | (2006.01) | |
| *E04B 5/48* | (2006.01) | |
| *E04F 13/072* | (2006.01) | |

(52) U.S. Cl.
CPC .............. *E01C 13/08* (2013.01); *A01K 1/015* (2013.01); *B08B 3/04* (2013.01); *E01C 13/02* (2013.01); *E04B 5/48* (2013.01); *E04F 13/072* (2013.01)

(58) Field of Classification Search
CPC ..... E01C 13/08; A01K 1/0151; A01K 1/0103; A01K 1/0107; A01K 1/011; A01K 1/015; A01K 1/0157; A01K 1/034; A01K 31/007; Y10S 273/13
USPC ......................................................... 119/450
See application file for complete search history.

(56) References Cited

U.S. PATENT DOCUMENTS

| | | |
|---|---|---|
| 4,038,944 A | 8/1977 | Tucci |
| 4,182,271 A | 1/1980 | Dodge et al. |
| 4,198,715 A | 4/1980 | Daniels |
| 4,362,128 A | 12/1982 | Downey |
| 4,768,465 A | 9/1988 | Church |
| 4,902,540 A | 2/1990 | Martino |

(Continued)

FOREIGN PATENT DOCUMENTS

WO   WO 93/06718 A1   4/1993

*Primary Examiner* — Joshua Huson
(74) *Attorney, Agent, or Firm* — Martin & Ferraro, LLP

(57) ABSTRACT

A floor cleaning system and method for use thereof is disclosed for facilitating removal of waste materials. The system includes and the method relies upon use of a floor base, a floor covering, a substrate spacing the floor base and the artificial grass surfacing apart from one another, and at least one fluid-carrying structure. The floor base receives the waste materials. The floor covering is spaced above the floor base, and is at least in part permeable to the waste materials and in liquid communication with the floor base. The fluid-carrying structure is adapted to provide cleaning fluid to the floor base to rinse the waste materials received thereon. The cleaning fluid and waste materials flow along the floor base under the floor covering to facilitate evacuation thereof.

12 Claims, 4 Drawing Sheets

(56) References Cited

U.S. PATENT DOCUMENTS

| | | |
|---|---|---|
| 4,946,719 A | 8/1990 | Dempsey |
| 4,953,501 A | 9/1990 | Moreau |
| 5,148,771 A | 9/1992 | Schuett et al. |
| 5,335,617 A | 8/1994 | Hoffman |
| 5,476,066 A | 12/1995 | Hoffman |
| 5,596,951 A | 1/1997 | Lagadec |
| 5,724,916 A | 3/1998 | Brodie et al. |
| 5,958,527 A | 9/1999 | Prevost |
| 6,029,608 A | 2/2000 | Johnson |
| 6,156,396 A | 12/2000 | Florian |
| 6,338,885 B1 | 1/2002 | Prevost |
| 6,551,689 B1 | 4/2003 | Prevost |
| 6,689,447 B2 | 2/2004 | Prevost |
| 6,723,412 B2 | 4/2004 | Prevost |
| 6,746,752 B2 | 6/2004 | Prevost |
| 6,767,595 B2 | 7/2004 | Prevost et al. |
| 6,877,932 B2 | 4/2005 | Prevost |
| 6,946,181 B2 | 9/2005 | Prevost |
| 6,989,179 B2 | 1/2006 | Prevost et al. |
| 7,014,390 B1 | 3/2006 | Morris |
| 7,207,742 B2 | 4/2007 | Prevost |
| 7,223,047 B2 | 5/2007 | Prevost |
| 7,273,642 B2 | 9/2007 | Prevost |
| 7,300,689 B2 | 11/2007 | Prevost |
| 7,306,838 B2 | 12/2007 | Prevost |
| 2002/0028307 A1 | 3/2002 | Prevost |
| 2003/0056432 A1 | 3/2003 | Prevost |
| 2003/0161996 A1 | 8/2003 | Prevost |
| 2003/0175448 A1 | 9/2003 | Prevost |
| 2004/0219308 A1 | 11/2004 | Prevost et al. |
| 2005/0008793 A1 | 1/2005 | Prevost |
| 2005/0031803 A1 | 2/2005 | Prevost |
| 2005/0044656 A1 | 3/2005 | Prevost |
| 2005/0284392 A1 | 12/2005 | Hillman |
| 2006/0037548 A1 | 2/2006 | Mohr |
| 2006/0048469 A1 | 3/2006 | MacLean |
| 2006/0088380 A1 | 4/2006 | Prevost |
| 2008/0095580 A1 | 4/2008 | Blackwood |
| 2009/0004409 A1 | 1/2009 | McCoy |
| 2009/0269517 A1 | 10/2009 | Karmie et al. |

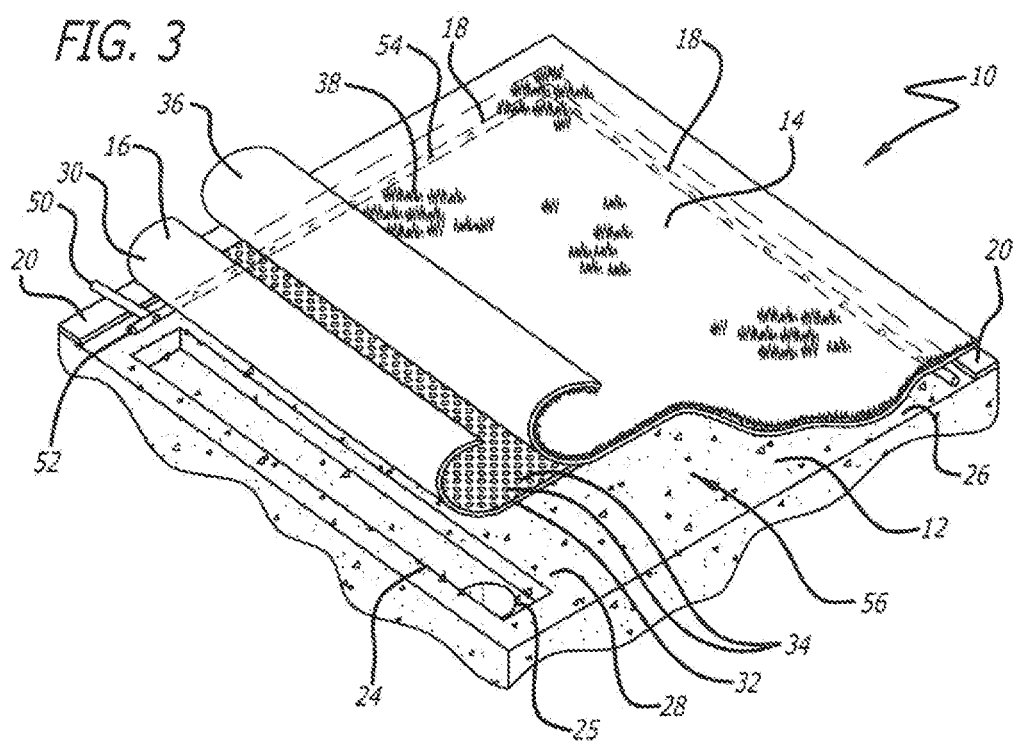
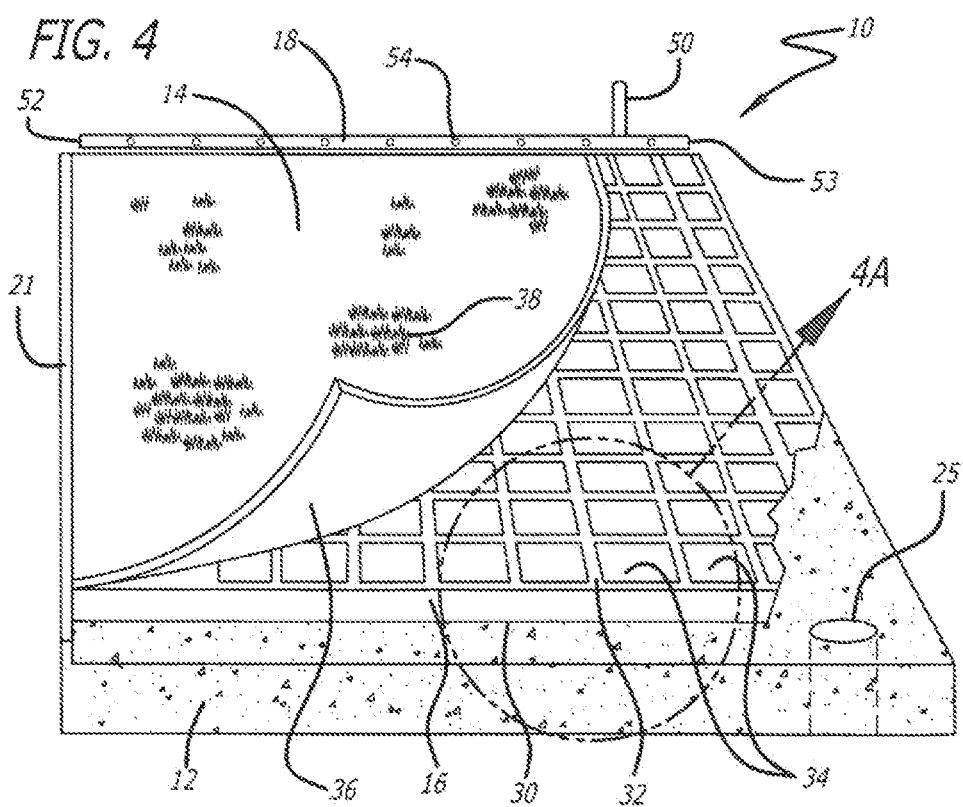

IMPERMEABLE LINER, SUBSTRATE, AND ARTIFICIAL GRASS SURFACE FOR ANIMALS AND HUMAN BEINGS TO WALK THEREON WITH HIDDEN CLEANING STRUCTURE AND METHOD FOR USE THEREOF

The present application is a continuation of U.S. application Ser. No. 12/150,561, filed Apr. 29, 2008; all of which is incorporated by reference herein.

BACKGROUND OF THE INVENTION

Field of the Invention

The present invention is generally related to a floor adapted to facilitate removal of waste materials therefrom. More particularly, the present invention is related to a floor having a floor base for receiving unwanted waste liquids and solids, a floor covering for passing the waste materials therethrough, and a built-in rinsing mechanism for facilitating removal of the waste materials from the floor base. More specifically, the present invention is related to a floor having a floor base for receiving waste liquids and solids thereon, a permeable floor covering for supporting human beings and animals and permitting passage of the waste materials therethrough, and a fluid-carrying structure for releasing cleaning fluids to rinse away and facilitate evacuation of the waste materials from the floor base.

Description of the Prior Art

Typically, conventional flooring can include a hard semi-impermeable base and a floor covering applied over the base. A padding layer can be provided between the base and the floor covering. Either way, however, waste materials (i.e., unwanted liquids and solids) received on the floor covering, depending on whether the floor covering is permeable, can pass therethrough, or remain on and possibly soak the floor covering. If the waste materials pass through the floor covering, the waste materials then can remain on the base, or, when padding is used, can potentially be trapped between the base and the floor covering by remaining on and possibly soaking the padding. Accordingly, it can be difficult to remove waste materials from conventional flooring.

When conventional flooring is used, for example, in animal enclosures, having the waste materials remain on or possibly soak the floor covering, remain on the base, or be trapped between the base and the floor covering can have deleterious consequences. Animal enclosures are enclosed indoor or outdoor structures for containing and/or sheltering animals therein. Given that the animals reside within the animal enclosures, the floors thereof receive waste materials such as spilled liquid and solid foods, liquids and solids expelled by the animals (e.g., urine and fecal matter), and other liquids or small debris. To facilitate removal of the waste materials, the floors of the animal enclosures usually permit rinsing thereof. A hose sprayer spraying water can be manipulated by a user to rinse the animal waste materials from these surfaces. However, such a rinsing operation is time consuming to the user, requires removal of the animals therefrom, and necessitates wetting the entire floor. Furthermore, if the waste materials are not removed from the floor, the waste materials may cause unhygienic conditions in the animal enclosures.

Therefore, there is a need for an improved floor. Such a floor can have permeable floor surfacing to pass unwanted liquid and solid waste materials therethrough, while having a semi-impermeable floor base to receive the waste materials thereon. Furthermore, a floor can employ a built-in rinsing mechanism for releasing cleaning fluids to rinse away and facilitate evacuation of the waste materials from the floor base.

SUMMARY OF THE INVENTION

The present invention in one preferred embodiment contemplates a waste removal system for removing waste materials, the waste removal system including a floor base for receiving the waste materials, a floor covering spaced above the floor base, the floor covering adapted to support a human being or an animal, and being at least in part permeable to the waste materials and in liquid communication with the floor base, and at least one fluid-carrying structure adapted to provide cleaning fluid to the floor base to rinse the waste materials received thereon, where the cleaning fluid and the waste liquids flow along the floor base under the floor covering to facilitate evacuation thereof.

The present invention in a further preferred embodiment contemplates a floor for use in an animal enclosure, the floor including a floor base being at least in part impermeable to waste materials received thereon, an artificial grass surfacing spaced above the floor base, the artificial grass surfacing being at least in part permeable to pass the waste materials therethrough, and at least one fluid-carrying structure adapted to provide cleaning fluid to the floor base to rinse the waste materials received thereon, where the cleaning fluid and the waste materials flow along the floor base under the artificial grass surfacing to facilitate drainage thereof.

The present invention in another preferred embodiment contemplates a method for removing waste materials from flooring by supporting a floor covering spaced above a floor base, exposing the floor covering to the waste materials, passing the waste materials through the floor covering to the floor base, rinsing the waste materials from the floor base with a cleaning fluid, and draining the cleaning fluid and the waste materials from the floor base.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate preferred embodiments of the invention. Together with the description, they serve to explain the objects, advantages and principles of the invention. In the drawings:

FIG. 3 is a perspective fragmentary view of the waste removal system of FIGS. 1 and 2 during installation;

FIG. 4 is a perspective fragmentary view of another embodiment of a waste removal system according to the present invention;

DETAILED DESCRIPTION OF THE PREFERRED EMBODIMENT

The following description is intended to be representative only and not limiting, and many variations can be anticipated according to these teachings. Reference will now be made in detail to the preferred embodiments of this invention, examples of which are illustrated in the accompanying drawings.

Figure 1:
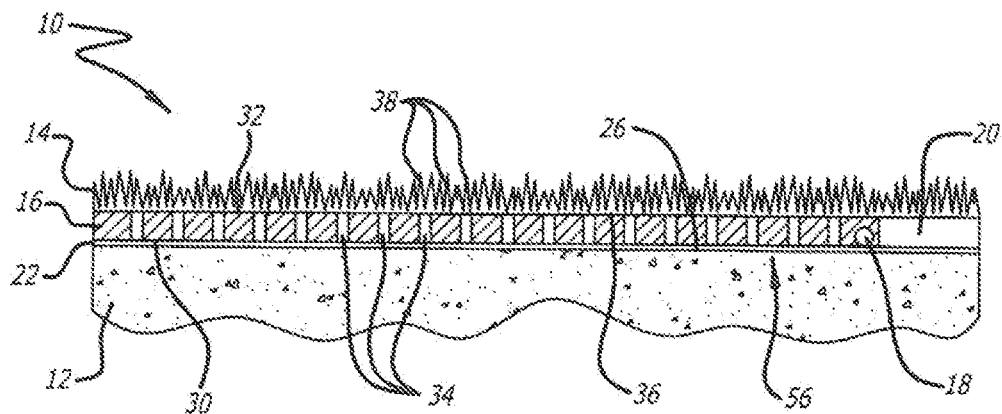
FIG. 1 is an elevational view of one embodiment of a waste removal system according to the present invention.
Figure 2:
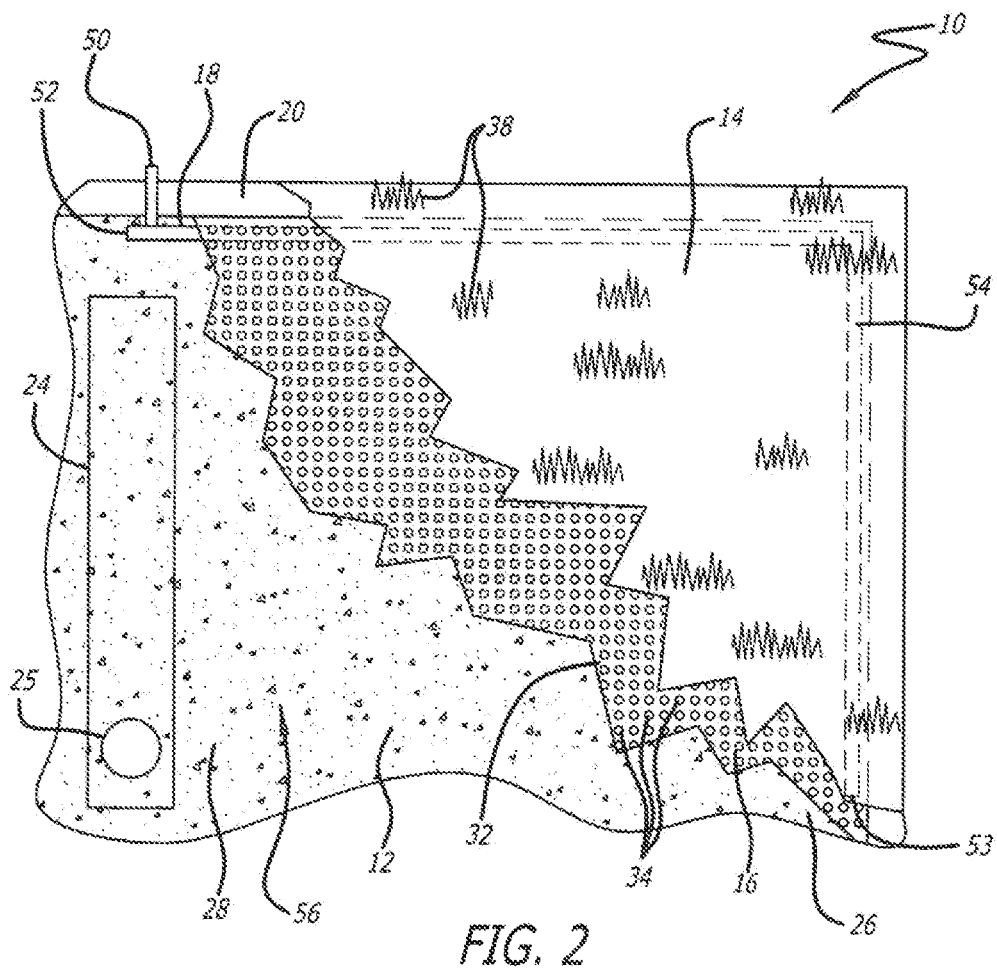
FIG. 2 is a plan fragmentary view of the waste removal system of FIG. 1.
Figure 3A:
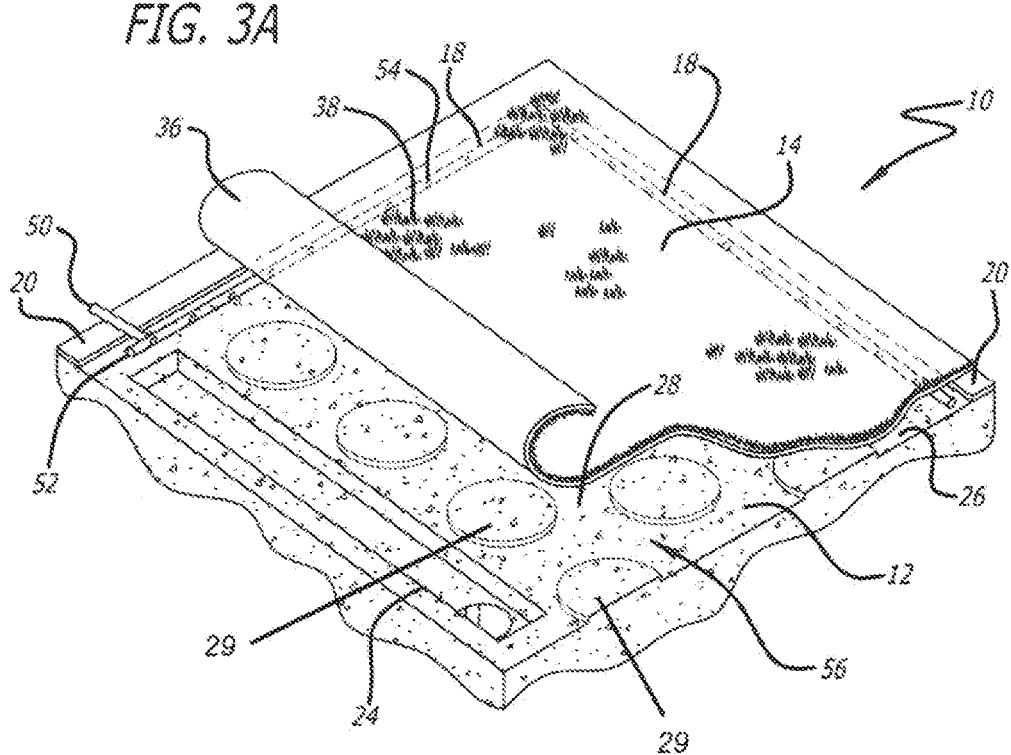
FIG. 3A is a perspective fragmentary view of a further embodiment of a waste removal system according to the present invention.

FIGS. 1-3 show one preferred embodiment and FIG. 4 shows another preferred embodiment of a waste removal system according to the present invention. In FIGS. 1-3 and FIG. 4, the preferred embodiments of the waste removal system are generally indicated by the numeral 10, and like numerals are used to indicate similar elements of the embodiments. Waste removal system 10 can serve as flooring for an area exposed to unwanted liquid and solid waste materials. Waste removal system 10 can be used in an indoor or an outdoor setting, and is provided to facilitate removal of the unwanted liquid and solid waste materials received thereon.

For example, waste removal system 10 can be used as flooring for indoor or outdoor animal enclosures. As used below, the words "animal enclosures" generally refer to indoor or outdoor animal containment and sheltering areas. For example, the animal enclosures can include animal containment or sheltering areas at zoos, farms, stables, kennels, shelters, and residential homes.

The animal enclosures at zoos, farms, stables, kennels, and shelters typically include various stalls for containing various animals apart from one another or common areas allowing the animals to more freely move about. Sometimes, single stalls can be provided in separate areas apart from one another, or multiple stalls can be provided in separate fenced partitions within the same area. Waste removal system 10 according to the present invention can serve as the flooring of areas forming single stalls, multiple stalls, or common areas. In doing so, waste removal system 10 can support animals thereon, and can facilitate removal of waste materials such as spilled liquid and solid foods, liquids and solids expelled by the animals (e.g., urine and fecal matter), and other liquids or small debris.

Additionally, waste removal system 10 can also be used as the flooring of indoor or outdoor athletic facilities, as well as residential spaces. For example, waste removal system 10 can serve as the playing surface of the indoor or outdoor athletic facilities. Furthermore, waste removal system 10 can serve as surfaces of residential patios and play areas. In these instances, waste removal system 10 can support human beings thereon, and facilitate removal of unwanted liquid and solid waste materials received thereon. Additional applications of waste removal system 10 will be also be apparent from the below-discussed description thereof.

Generally, the embodiments of waste removal system 10, as shown in FIGS. 1-3 and in FIG. 4 include a floor base (or sub-floor) 12 and a floor covering 14 spaced above floor base 12. Waste removal system 10 also generally includes a substrate 16 and a fluid-carrying structure 18. Substrate 16 can support floor covering 14 on floor base 12. Furthermore, floor covering 14 can be configured to obscure the view of floor base 12, substrate 16, and the waste materials disposed thereunder. For example, floor covering 14 can be adapted to block the view of floor base 12, substrate 16, and the waste materials, and, in doing so, hide the operation of waste removal system 10 from view. As such, waste removal system 10 can maintain an aesthetically pleasing appearance, and avoid unnecessary exposure of a user to the waste materials disposed under floor covering 14.

Substrate 16 spaces floor base 12 and floor covering 14 apart from one another to provide a clearance therebetween. In waste removal system 10 of FIGS. 1-3, fluid-carrying structure 18 is positioned between floor base 12 and floor covering 14 in the clearance afforded by substrate 16. Furthermore, in waste removal system 10 of FIG. 4, fluid-carrying structure 18 is positioned above floor covering 14.

A barrier 20 (shown in FIGS. 1-3) or a lip 21 (shown in FIG. 4) can be provided adjacent one or more edges of waste removal system 10. Barrier 20 can be formed, for example, from planks of pressure-treated lumber and/or planks of moisture-resistant artificial materials marketed under the trademarks TREX® and AZEK®, and can be secured to floor base 12 and sealed therearound to inhibit the waste materials from passing thereby. Furthermore, lip 21 can be formed, for example, as part of floor base 12. Either way, barrier 20 and lip 21 can inhibit the waste materials received on floor base 12 within the area defined by barrier 20 and lip 21 from escaping thereby. For example, barrier 20 and lip 21 can abut the perimeter of the area in which waste removal system 10 is provided to inhibit the waste materials from leaving the area. Furthermore, barrier 20 and lip 21 can also be used for securing floor covering 14. As discussed below, floor covering 14 can be secured to barrier 20 or lip 21 at the edges of waste removal system 10.

Floor base 12 is provided to receive the waste materials, and allow the waste materials to flow therealong. Floor base 12 can be formed from a semi-impermeable hard material provided to inhibit the waste materials from penetrating therethrough. For example, floor base 12 can be constructed of concrete, asphalt, or ceramic. When constructed with these materials, the concrete can be poured and the asphalt can be laid into position on the ground to form floor base 12. Furthermore, ceramic in the form of tiles can be positioned within a setting provided on the ground to form floor base 12. To enhance the impermeability of floor base 12 (when constructed of concrete, asphalt, or ceramic materials), a moisture-resistant sealant can be applied thereon. Furthermore, an impermeable liner 22, as shown in FIG. 1, can be applied over floor base 12 to prevent the waste materials from penetrating through floor base 12. Impermeable liner 22, for example, can be made of a sheet or sheets of polymeric materials such as plastic or rubber applied over floor base 12. Rather than using a semi-impermeable hard material for construction thereof, floor base 12 can also be formed by applying impermeable liner 22 directly over the ground or crushed aggregate covering the ground.

A drainage trench 24 is provided to drain the waste materials received on floor base 12. Although only drainage trench 24 is shown in FIGS. 1-3, multiple trenches can be provided to drain the waste materials received on floor base 12. For example, trenches can be provided proximate the middle and/or or the edges of waste removal system 10. Furthermore, a drain passage 25 can be provided to receive the waste materials accumulated in drainage trench 24. As shown in FIG. 4, rather than being used in combination with drainage trench 24, drain passage 25 can be used solely to receive the waste materials. Furthermore, although only one drain passage is shown in FIG. 4, multiple passages can be provided. For example, drain passages 25 can be provided proximate the center and/or the corners of waste removal system 10.

To facilitate the flow of the waste materials therealong, in a preferred embodiment, floor base 12 can be sloped. As shown in FIG. 1-3, for example, floor base 12 is gradually sloped at a pitch of 1.5% from a first elevation 26 to a second elevation 28 lower than first elevation 26. While a pitch of 1.5% is preferred, floor base 12 can facilitate flow of waste materials thereover with alternate preferred pitches ranging, for example, from 1.0 to 10% and more preferably from 1.25 to 2.5%. An edge of the waste removal system 10, as shown FIGS. 2 and 3, is provided proximate first elevation 26, and drainage trench 24 is provided proximate second elevation 28. Accordingly, the waste materials received on floor base 12 in an area between first elevation 26 and second elevation 28 are directed toward drainage trench 24.

Substrate 16 is positioned on floor base 12 to support floor covering 14. Substrate 16 facilitates passage of the waste materials from floor covering 14 to floor base 12. Substrate 16 can be formed from a unitary piece of polymeric material (shown in FIGS. 1-3). Furthermore, substrate 16 can be formed of metal, plastic, or wood grating (shown in FIG. 4). Substrate 16 can also be formed of pedestals 29 (shown in FIG. 3A) formed separately or integrally with floor base 12.

The thickness or height of substrate 16 defines the clearance that floor base 12 and floor covering 14 are spaced apart from one another. For example, the thickness of substrate 16 can be one (1) inch to provide one (1) inch of clearance between floor base 12 and floor covering 14. However, the thickness of substrate 16 should not be so limited. Substrate 16 can have a lesser or greater thickness depending, for example, on the diameter of fluid-carrying structure 18 positioned between floor base 12 and floor covering 14 (shown in FIG. 1).

When formed of the unitary piece of polymeric material, or of the metal, plastic, or wood grating, substrate 16 includes a first side 30 facing floor base 12, and a second side 32 facing floor covering 14. Substrate 16 of FIGS. 1-3 includes various openings 34 therethrough to permit passage of the waste materials from second side 32 to first side 30. Although openings 34 of FIGS. 1-3 are shown having a circular cross-section, openings 34 can have any variety of cross-sectional shapes. For example, openings 34, as shown in FIG. 4, can have a square cross-section. Openings 34 afford passage of the waste materials from floor covering 14 to floor base 12.

Figure 4A:
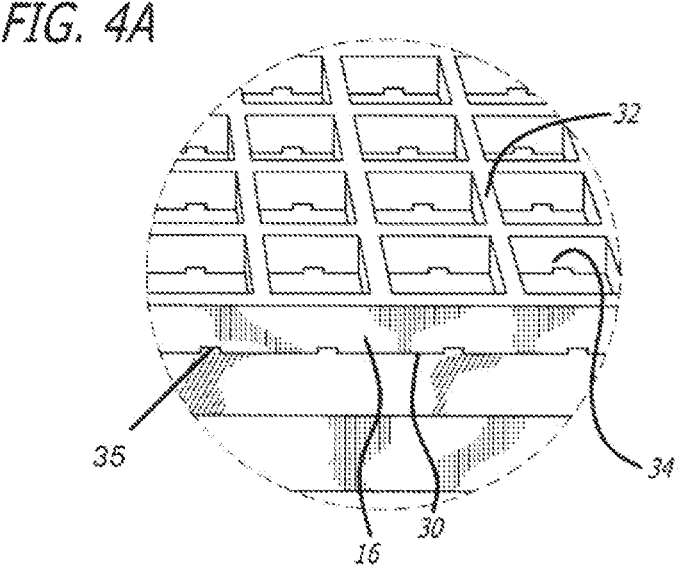
FIG. 4A is a perspective fragmentary view of yet another embodiment of a waste removal system according to the present invention.

As shown in FIG. 4A, channels 35 can be provided in first side 30 of substrate 16 facing floor base 12. Channels 35 can, for example, be formed by molding a shape and/or by removing material from first side 30 of substrate 16. Channels 35 can provide a passage for moving the waste materials between floor base 12 and substrate 16. For example, channels 35 can be aligned with the slope of floor base 12 to direct the waste materials to drainage trench 24 and/or drain passage 25.

Like substrate 16, pedestals 29 formed separately or integrally with floor base 12 space floor base 12 and floor covering 14 apart from one another. Pedestals 29 are raised protrusions extending upwardly from floor base 12 for supporting floor covering 14 thereon, and are positioned apart from one another along floor base 12 with gaps therebetween. As such, pedestals 29 afford passage therebetween of the waste materials from floor covering 14 to floor base 12, and along floor base 12.

Floor covering 14 can, for example, be permeable artificial grass material and carpeting, or other permeable materials. When floor covering 14 is an artificial grass material, as shown in FIGS. 1-4, an artificial grass marketed under the trademark K9GRASS™ can be used. Furthermore, floor covering 14 can be secured at the edges of waste removal system 10, or alternatively be secured to substrate 16. For example, floor covering 14 can be adhered or mechanically fastened to barrier 20, lip 21, and/or substrate 16. By securing floor covering 14 to barrier 20, lip 21, and/or substrate 16, floor covering 14 can be maintained in position relative to floor base 12.

As shown in FIG. 1, the artificial grass material forming floor covering 14 includes a backing 36 and blades 38 extending outwardly therefrom. The density, height, and shape of blades 38 can be configured to be comfortable, while also being durable and easy to clean. Furthermore, backing 36 can be a knitted fabric and/or a unitary piece of polymeric material with openings (not shown) formed therein. The openings formed in backing 36 are smaller than openings 34 formed in substrate 16 of FIGS. 1-3 and of FIG. 4, but should be sized to accommodate passage of the waste materials therethrough. As such, backing 36 can be permeable to liquids, and, if the openings formed therein are large enough, can permit small particulate to pass therethrough. Accordingly, backing 36 can facilitate passage therethrough of the liquid or solid waste materials received on floor covering 14.

As discussed above, fluid-carrying structure 18, as shown in FIGS. 1-3 is positioned between floor base 12 and floor covering 14, and fluid-carrying structure 18, as shown in FIG. 4, is positioned above floor covering 14. Either way, fluid-carrying structure 18 is connected to a supply of cleaning fluid, and provides the cleaning fluid to floor base 12.

Figure 5:
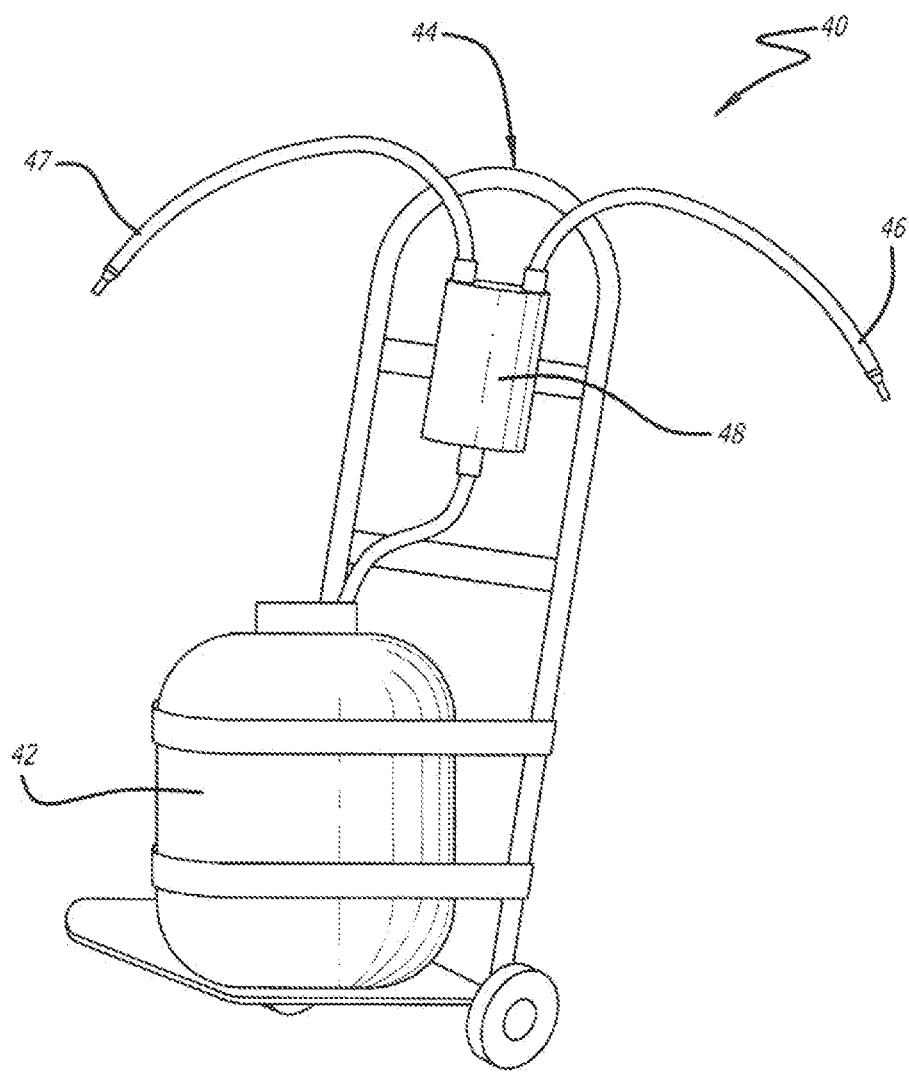
FIG. 5 is an elevational view of a cleaning fluid infusion device for use with the waste removal system.

The cleaning fluid can be water supplied directly to fluid-carrying structure 18 or mixed in various concentrations with concentrated cleaning solution using, as shown in FIG. 5, an optional infusion unit 40. Infusion unit 40 includes a tank 42 filled with concentrated cleaning fluid supported by a dolly 44. An input line 46 and an output line 47 are connected to an infuser 48 that communicates with the concentrated cleaning fluid in tank 42. Water supplied through input line 46 is mixed with the concentrated cleaning fluid at infuser 48. Thereafter, the cleaning fluid (a mixture of water and the concentrated cleaning fluid) exits infuser 48 through output line 47. To supply waste removal system 10 with the cleaning fluid, output line 47 can be connected to fluid-carrying structure 18.

Fluid-carrying structure 18 can be formed from piping having various lengths extending between floor base 12 and floor covering 14 (shown in FIGS. 1-3) or extending above floor covering 14 (shown in FIG. 4). For example, the piping of fluid-carrying structure 18 can be formed of CPVC (chlorinated polyvinyl chloride) pipe. Furthermore, fluid-carrying structure 18 can include a connection 50 for connecting the piping thereof with the supply of cleaning fluid, and have ends 52 and 53 blocked with end caps mating therewith. For example, connection 50 can connect fluid-carrying structure 18 directly to a water supply or with output line 47 of infusion unit 40.

Various apertures 54 can be spaced at intervals along fluid-carrying structure 18 to release the cleaning fluid at various locations along floor base 12. The configuration of various apertures 54 can determine how the cleaning fluid is released on floor base 12. For example, apertures 54 can be configured to spray or stream the cleaning fluid exiting therefrom onto floor base 12.

Fluid-carrying structure 18 can have various lengths, shapes, and positions to facilitate cleansing of floor base 12. For example, as shown in FIG. 2, fluid-carrying structure 18 can have an L-shaped footprint with two lengths of piping facilitating placement adjacent two edges of waste removal system 10. However, the configuration of fluid-carrying structure 18 should not be so limited. For example, fluid-carrying structure 18 can have lengths of piping facilitating placement adjacent one or more edges, around the perimeter, and/or through the center of waste removal system 10.

Fluid-carrying structure 18 can be positioned proximate the highest elevation of floor base 12. As discussed above, floor base 12 of FIGS. 1-3 is sloped from first elevation 26 at the edges of the waste removal system 10 to drainage trench 24 at second elevation 28. As such, a portion of fluid-carrying structure 18 is positioned proximate first elevation 26 to insure that the cleaning fluid travels from first elevation 26 to second elevation 28 to rinse waste materials therebetween. Accordingly, the area between fluid-carrying structure 18, and drainage trench 24 and/or drain passage 25 defines a waste removal zone 56.

Depending on the size of the area in which waste removal system 10 is provided, waste removal system 10 can be adapted to provide multiple waste removal zones. For example, each of the waste removal zones could include fluid-carrying structure 18 and drainage trench 24 and/or drain passage 25 associated therewith with floor base 12 sloping therebetween.

In a preferred embodiment, the supply of cleaning fluid is provided to fluid-carrying structure 18 at a pressure of 5-14 psi and more preferably at a pressure of 7-10 psi, and fluid-carrying structure 18 is adapted accordingly. For example, for lengths of 30-60 feet, the piping forming fluid-carrying structure 18 can have a diameter of three-quarter (¾) inches to accommodate that pressure of the cleaning fluid. Furthermore, apertures 54 would have diameters of one-eighth (⅛) inches, and be spaced 5-12 inches apart from one another and more preferably 10 inches apart from one another to accommodate that pressure of the cleaning fluid. Accordingly, depending on the pressure of the supply of the cleaning fluid and the length of the piping forming fluid-carrying structure 18, the size and spacing of apertures 54 can be varied.

During use of waste removal system 10, the waste materials received on floor covering 14 first pass through the openings formed in backing 36 thereof. Thereafter, the waste materials pass through substrate 16, and are received on floor base 12. Because floor base 12, in a preferred embodiment, includes a slope thereto, the waste materials are directed to drainage trench 24 (shown in FIGS. 1-3) and/or drain passage 25 (shown in FIGS. 1-4).

The cleaning fluid provided by fluid-carrying structure 18 cleanses floor base 12 of the waste materials by rinsing thereof. In doing so, the mixture of the cleaning fluid with the waste materials can be moved (using the force of the cleaning fluid and the slope of floor base 12) toward drainage trench 24 or drain passage 25. As such, the mixture of the cleaning fluid with the waste materials can be evacuated from floor base 12.

By receiving the waste materials on floor base 12 and facilitating drainage therefrom, floor surfacing 14 can be kept substantially dry of the cleaning fluid provided by fluid-carrying structure 18. For example, because fluid-carrying structure 18 of FIGS. 1-3 is provided between floor base 12 and floor covering 14, floor covering 14 in this embodiment of waste removal system 10 need not be wetted with the cleaning fluid to rinse floor base 12 and facilitate evacuation of the waste materials therefrom. Furthermore, because fluid-carrying structure 18 of FIG. 4 is positioned above floor covering 14, floor covering 14 in this embodiment of waste removal system 10 need only be wetted in a confined area adjacent fluid-carrying structure 18. As such, while a user can manipulate a hose sprayer to spray floor covering 14, operation of waste removal system 10 allows floor covering 14 to remain substantially dry if the user so desires.

Waste removal system 10 can be automated by providing a programmable controller (not shown) and an associated valve (not shown) positioned upstream of fluid-carrying structure 18. The programmable controller system can actuate the valve to control flow of cleaning fluid provided to floor base 12 from fluid-carrying structure 18. As such, the programmable controller can be used to define various wash cycles for waste removal system 10.

To define a wash cycle, the programmable controller can be set to provide a specified amount of the cleaning fluid to floor base 12 at specified times for specified durations. For example, the programmable controller can be set to provide a continuous flow (as opposed to an intermittent flow) of cleaning fluid to floor base 12 every morning for twenty (20) minutes.

Furthermore, while floor surfacing 14 can be kept substantially dry of the cleaning fluid, floor surfacing 14 can be soaked with the cleaning fluid during operation using the programmable controller. For example, programmable controller can be configured to control another valve to close drain passage 25, and/or can be set to release the cleaning fluid for a specified time onto floor base 12 at a rate faster than the cleaning fluid and the waste materials are drained therefrom. In doing so, floor covering 14 and floor substrate 16, as well as floor base 12, can be soaked in cleaning fluid before the cleaning fluid and waste materials are drained therefrom.

Fluid-carrying structure 18 can be connected to a supply of air, and/or an additional air-carrying structure (not shown) connected to the supply of air can be provided. Like fluid-carrying structure 18, the air-carrying structure can be provided between floor base 12 and floor covering 14, and/or positioned above floor covering 14. As such, after floor base 12 has been cleansed, for example, air can be directed by fluid-carrying structure 18 and/or the air-carrying structure over floor base 12 to drive residuals (i.e. the mixture of the cleaning fluid with the waste materials) toward drainage trench 24 and/or drain passage 25, as well as facilitate drying of floor base 12. Furthermore, the air supplied from the supply of air can be heated to force evaporation of the residuals so that floor base 12 can be dried quickly.

Other embodiments of the invention will be apparent to those skilled in the art from consideration of the specification and practice of the invention disclosed herein. For example, while described in association animal enclosures, waste removal system 10 can also be used as the flooring of athletic facilities and residential spaces. Accordingly, it is intended that the specification and examples be considered as exemplary only, with a true scope and spirit of the invention being indicated by the following claims.

What is claimed is:

1. A floor constructed to support animals and human beings thereon, the floor comprising:
   a floor base including an impermeable liner being in fixed position relative to ground, said liner being impermeable to waste materials received thereon, the waste materials from animals on said floor including urine;
   an artificial grass surfacing having a backing and blades extending upwardly from said backing, said artificial grass surfacing having an upper facing surface upon which the animals and human beings walking thereon will be in contact, said artificial grass surfacing being spaced above and in fixed relationship to said floor base, said backing of said artificial grass surfacing having a plurality of openings therethrough so that the urine of the waste materials can pass therethrough, said backing of said artificial grass surfacing being one of a knitted fabric and a unitary piece of polymeric material;

a substrate positioned between said floor base and said artificial grass surfacing, said substrate having a first side oriented toward and at least in part contacting said floor base and a second side contacting said artificial grass surfacing and a maximum height between said first side and said second side, said substrate supporting said artificial grass surfacing above said floor base and having a plurality of openings extending from said first side to said second side for passing the waste materials passing through said artificial grass surfacing to said floor base, a majority of said plurality of openings of said substrate being larger than said plurality of openings through said backing of said artificial grass surfacing, said first side of said substrate having channels therein to permit the waste materials on said floor base to move along said floor base and between said floor base and said substrate, said second side of said substrate contacting said artificial grass surfacing having a surface area and said first side of said substrate contacting said floor base having a surface area less than the surface area of said second side, said substrate having an outer perimeter, said second side of said substrate extending under a middle portion of said artificial grass surfacing, said artificial grass surfacing being configured to block from view said floor base, said substrate, and the waste materials that have passed through said artificial grass surfacing, each of said plurality of openings at said second side of said substrate having a cross section in a plane parallel to said backing of said artificial grass surfacing, said each of said plurality of said openings of said substrate having a maximum dimension measured across said cross section in said plane, said surface area of said first side and said second side each having a minimum width between adjacent openings of said plurality of openings, said maximum dimension of one of said plurality of said openings being greater than said minimum width on said first side of said surface area surrounding said one of said plurality of said openings, said maximum height of said substrate being greater than said minimum width on said second side;

a barrier adjacent an edge of said floor base, said barrier being secured to said floor base, said barrier inhibiting passage of liquid cleaning fluid and the waste materials thereby, said artificial grass surfacing being secured to said barrier to maintain said artificial grass surfacing in position relative to said floor base;

at least one fluid-carrying structure comprising a length of pipe having a plurality of spaced apart outlet apertures and at least one inlet connector, said at least one inlet connector configured for attaching said at least one fluid-carrying structure to a liquid cleaning fluid supply source and an air supply source such that said fluid carrying structure is adapted to provide either the liquid cleaning fluid to said floor base to rinse the waste materials received thereon or the air across said floor base to dry said floor base through said plurality of spaced apart outlet apertures to spaced locations along said floor base, wherein the liquid cleaning fluid and the waste materials flow along said floor base under said artificial grass surfacing to facilitate drainage thereof, said length of pipe being positioned between said floor base and said artificial grass surfacing, said artificial grass surfacing being configured to block from view said plurality of spaced apart outlet apertures;

a controller configured for controlling at least one of the flow of the liquid cleaning fluid, an amount of the liquid cleaning fluid, a specific time to begin the flow of the liquid cleaning fluid, and duration of flow of the liquid cleaning fluid from the liquid cleaning fluid supply source adapted to provide the liquid cleaning fluid to said floor base to rinse the waste materials received thereon; and at least one of a drainage trench and a drain passage for receiving the liquid cleaning fluid provided from said at least one fluid-carrying structure mixed with the waste materials.

2. The floor according to claim 1, wherein the cross section of said plurality of said openings is circular.

3. The floor according to claim 1, wherein said second side of said substrate forms a grid of spaced surfaces oriented in a first direction crossed by spaced surfaces in a second direction generally transverse to the first direction.

4. The floor according to claim 1, wherein said substrate is rigid.

5. The floor according to claim 1, wherein said substrate provides generally uniform support to said artificial grass surfacing via a repeating pattern of surfaces along said second side of said substrate.

6. A method for removing waste materials from flooring, the waste materials including urine from animals, the method comprising:

fixing a floor base including an impermeable liner in position relative to ground, the liner being impermeable to waste materials received thereon, the waste materials from animals on the flooring including urine;

fixing an artificial grass surfacing in relation to the floor base, the artificial grass surfacing having a backing and blades extending upwardly from the backing, the artificial grass surfacing having an upper facing surface upon which the animals and human beings walking thereon will be in contact, the backing of the artificial grass surfacing having a plurality of openings therethrough so that at least the urine of the waste materials can pass therethrough, the backing of the artificial grass surfacing being one of a knitted fabric and a unitary piece of polymeric material;

supporting the artificial grass surfacing spaced above the floor base with a substrate, the substrate being positioned between the floor base and the artificial grass surfacing, the substrate having a first side oriented toward and at least in part contacting the floor base and a second side facing the artificial grass surfacing and a maximum height between the first side and the second side, the substrate having a plurality of openings extending from the first side to the second side for passing the waste materials that pass through the artificial grass surfacing to the floor base, a majority of the plurality of openings of the substrate being larger than the plurality of openings through the backing of the artificial grass surfacing, the first side of the substrate having channels therein to permit the waste materials on the floor base to move along the floor base and between the floor base and the substrate, the second side of the substrate contacting the artificial grass surfacing having a surface area and the first side of the substrate contacting the floor base having a surface area less than the surface area of the second side, the substrate having an outer perimeter, the second side of the substrate extending under a middle portion of the artificial grass surfacing, the artificial grass surfacing being configured to block from view the floor base, the substrate, and the waste materials that have passed through the artificial grass surfacing, each of the plurality of openings at the second side of the substrate having a cross section in a plane parallel to the backing of the artificial grass surfacing, the each of the plurality of the openings of the substrate having a maximum dimension measured across the cross section in the plane, the surface area of the first side and the second side each having a minimum width between adjacent openings of the plurality of openings, the maximum dimension of one of the plurality of the openings being greater than the minimum width on the first side of the surface area surrounding the one of the plurality of the openings, the maximum height of the substrate being greater than the minimum width on the second side;

securing a barrier adjacent an edge of the floor base, the barrier being configured to inhibit passage of liquid cleaning fluid and the waste materials thereby;

securing the artificial grass surfacing to the barrier to maintain the artificial grass surfacing in fixed position relative to the floor base;

positioning at least one fluid-carrying structure comprising a length of pipe having a plurality of spaced apart outlet apertures and at least one inlet connector between the floor base and the artificial grass surfacing such that the artificial grass surfacing blocks from view the plurality of spaced apart outlet apertures, the at least one inlet connector configured for attaching the at least one fluid-carrying structure to a liquid cleaning fluid supply source and an air supply source such that the fluid carrying structure is adapted to provide either the liquid cleaning fluid to the floor base to rinse the waste materials received thereon or the air across the floor base to dry the floor base through the plurality of spaced apart outlet apertures to spaced locations along the floor base;

exposing the artificial grass surfacing to the waste materials;

passing at least the urine of the waste materials through the artificial grass surfacing and the substrate to the floor base;

controlling at least one of the flow of the liquid cleaning fluid, an amount of the liquid cleaning fluid, a specific time to begin the flow of the liquid cleaning fluid, and duration of flow of the liquid cleaning fluid to the floor base to rinse the waste materials received thereon;

rinsing the waste materials from the floor base with the liquid cleaning fluid using the at least one fluid-carrying structure, wherein the liquid cleaning fluid and the waste materials in contact with the floor base flow along the floor base under the artificial grass surfacing to facilitate drainage thereof;

draining the liquid cleaning fluid and the waste materials from the floor base; and flowing air across the floor base between the floor base and the artificial grass using the at least one fluid-carrying structure positioned below the artificial grass surfacing to change the temperature of the air proximate the floor base.

7. The method according to claim 6, further comprising simultaneously wetting the floor base with the cleaning fluid, and maintaining the floor covering dry of the cleaning fluid.

8. The method according to claim 6, further comprising for a specified time releasing the cleaning fluid on the floor base at a rate faster than the cleaning fluid and the waste materials are drained from the floor base to soak the floor base.

9. The method according to claim 6, further comprising opening a drain passage to drain the cleaning fluid and the waste materials from the floor base, and closing the drain passage to soak the artificial grass surfacing, the substrate, and the floor base with the cleaning fluid.

10. The method according to claim 6, wherein flowing air across the floor base between the floor base and the artificial grass using the at least one fluid-carrying structure positioned below the artificial grass surfacing to change the temperature of the air proximate the floor base further includes heating the air flowing across the floor base between the floor base and the artificial grass.

11. A floor constructed to support animals and human beings thereon, the floor comprising:

an artificial grass surfacing having a backing and blades extending upwardly from said backing, said artificial grass surfacing being in fixed relationship to a floor base and including a surface upon which the animals and the human beings walking thereon will be in contact, said backing of said artificial grass surfacing having a plurality of openings therethrough so that waste materials including urine from the animals can pass therethrough to said floor base, said backing of said artificial grass surfacing being one of a knitted fabric and a unitary piece of polymeric material;

said floor base including an impermeable liner being in fixed position relative to ground, said liner being impermeable to the waste materials passing through said artificial grass surfacing and received thereon, said impermeable liner including an upwardly facing surface and raised protrusions formed integrally with said upwardly facing surface, said raised protrusions directly contacting and supporting said artificial grass surfacing above said upwardly facing surface, said backing of said artificial grass between said raised protrusions being suspended over said upwardly facing surface so that each of said plurality of openings through said artificial grass between said raised protrusions can permit urine to fall therethrough directly onto said upwardly facing surface, said raised protrusions being positioned apart from one another to permit the removal of the waste materials received on said upwardly facing surface therebetween, said plurality of openings of said artificial grass surfacing being above and between said raised protrusions, said artificial grass surfacing being configured to block from view said floor base, and the waste materials that have passed through said artificial grass surfacing and into contact with said upwardly facing surface;

a barrier adjacent an edge of said floor base, said barrier being secured to said floor base, said barrier inhibiting passage of a liquid cleaning fluid and the waste materials thereby, said artificial grass surfacing being secured to said barrier to maintain said artificial grass surfacing in position relative to said floor base;

at least one fluid-carrying structure comprising a length of pipe having a plurality of spaced apart outlet apertures and at least one inlet connector, said at least one inlet connector configured for attaching said at least one fluid-carrying structure to a liquid cleaning fluid supply source and an air supply source such that said fluid carrying structure is adapted to provide either the liquid cleaning fluid to said upwardly facing surface of said impermeable liner to rinse the waste materials received thereon or the air across said floor base to dry said floor base through said plurality of spaced apart outlet apertures to spaced locations along said upwardly facing surface, wherein the liquid cleaning fluid and the waste materials flow along said upwardly facing surfacing under said artificial grass surfacing to facilitate drainage thereof, said length of pipe being positioned between said floor base and said artificial grass surfacing, said artificial grass surfacing being configured to block from view said plurality of spaced apart outlet apertures;

a controller configured for controlling at least one of the flow of the liquid cleaning fluid, an amount of the liquid cleaning fluid, a specific time to begin the flow of the liquid cleaning fluid, and duration of flow of the liquid cleaning fluid from the liquid cleaning fluid supply source adapted to provide the liquid cleaning fluid to said floor base to rinse the waste materials received thereon; and at least one of a drainage trench and a drain passage for receiving the liquid cleaning fluid provided from said at least one fluid-carrying structure mixed with the waste materials.

12. The floor according to claim 11, further comprising a waste removal zone on said floor base defined between a first elevation and a second elevation lower than said first elevation, said at least one fluid-carrying structure being disposed proximate said first elevation, and at least one of a drainage trench and a drain passage being disposed proximate said second elevation.

* * * * *